US012533895B2

(12) United States Patent
Nishimura et al.

(10) Patent No.: US 12,533,895 B2
(45) Date of Patent: Jan. 27, 2026

(54) SHEET DISCHARGE DEVICE, AND SHEET POSTPROCESSING DEVICE, IMAGE FORMING APPARATUS, PLUS IMAGE FORMING SYSTEM EACH INCLUDING THE SHEET DISCHARGE DEVICE

(71) Applicant: KYOCERA Document Solutions Inc., Osaka (JP)

(72) Inventors: Takuya Nishimura, Osaka (JP); Seiichi Shirasaki, Osaka (JP); Yasunori Ueno, Osaka (JP); Takehiko Okada, Osaka (JP); Keisuke Egawa, Osaka (JP); Terumitsu Noso, Osaka (JP); Yusuke Takano, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 188 days.

(21) Appl. No.: 18/410,729

(22) Filed: Jan. 11, 2024

(65) Prior Publication Data

US 2024/0239119 A1 Jul. 18, 2024

(30) Foreign Application Priority Data

Jan. 18, 2023 (JP) ................................ 2023-005571

(51) Int. Cl.
*B41J 13/00* (2006.01)
*B41J 13/03* (2006.01)
(Continued)

(52) U.S. Cl.
CPC ........... *B41J 13/0036* (2013.01); *B41J 13/00* (2013.01); *B41J 13/0054* (2013.01);
(Continued)

(58) Field of Classification Search
CPC ................ B41J 13/0036; B41J 13/0054; B41J 13/0063; B41J 13/03; B41J 13/00;
(Continued)

(56) References Cited

U.S. PATENT DOCUMENTS

2010/0244354 A1* 9/2010 Suh ........................ B65H 29/60 271/3.14
2011/0075212 A1* 3/2011 Mikura ............... B41F 33/0009 358/1.15

FOREIGN PATENT DOCUMENTS

JP 2018135204 A * 8/2018 ............. B65H 31/26
JP 2022117729 A * 8/2022 ............. B65H 31/00

* cited by examiner

*Primary Examiner* — Yaovi M Ameh
(74) *Attorney, Agent, or Firm* — Stein IP, LLC

(57) ABSTRACT

The sheet discharge device includes a sheet discharge port, a discharge member, a sheet discharge tray, a support member, a drive mechanism, and a controller. The discharge member conveys sheets in a discharge direction. On the sheet discharge tray, the sheets discharged from the sheet discharge port are to be stacked. The support member is movable by the drive mechanism between a projective position in which the support member is projected to above the sheet discharge tray so as to support the sheets, and a retractive position in which the support member has retracted from the projective position to an upstream side of the sheet discharge port. The controller is enabled to adjust at least one of a projective length of the support member in its projective position and a shift timing from the projective position to the retractive position in response to characteristics of the sheets.

10 Claims, 7 Drawing Sheets

(51) Int. Cl.

| | |
|---|---|
| ***B65H 29/20*** | (2006.01) |
| ***B65H 29/52*** | (2006.01) |
| ***B65H 31/02*** | (2006.01) |
| ***B65H 31/10*** | (2006.01) |
| ***B65H 31/26*** | (2006.01) |
| *B65H 29/66* | (2006.01) |

(52) U.S. Cl.
CPC ........... *B41J 13/0063* (2013.01); *B41J 13/03* (2013.01); *B65H 29/20* (2013.01); *B65H 29/52* (2013.01); *B65H 31/02* (2013.01); *B65H 31/10* (2013.01); *B65H 31/26* (2013.01); *B65H 29/66* (2013.01); *B65H 2404/68* (2013.01); *B65H 2701/1131* (2013.01)

(58) Field of Classification Search
CPC .... B65H 31/26; B65H 2404/68; B65H 31/02; B65H 31/10; B65H 29/52; B65H 29/20; B65H 29/66; B65H 2701/1131
See application file for complete search history.

SHEET DISCHARGE DEVICE, AND SHEET POSTPROCESSING DEVICE, IMAGE FORMING APPARATUS, PLUS IMAGE FORMING SYSTEM EACH INCLUDING THE SHEET DISCHARGE DEVICE

INCORPORATION BY REFERENCE

This application is based on and claims the benefit of priority from Japanese Patent Application No. 2023-005571 filed on Jan. 18, 2023, the contents of which are hereby incorporated by reference.

BACKGROUND

The present disclosure relates to a sheet discharge device for discharging a sheet that has been subjected to image formation by an image forming apparatus, and also relates to a sheet postprocessing device, an image forming apparatus, and an image forming system each including the foregoing sheet discharge device.

An image forming apparatus such as copiers and printers, or a sheet postprocessing device for performing postprocessing on a sheet, is equipped with a sheet discharge device including a discharge roller pair and a discharge tray. A sheet (paper) that has been subjected to image formation by the image forming apparatus is discharged onto the discharge tray by the sheet discharge device provided in the image forming apparatus. Otherwise, a sheet, after carried into the sheet postprocessing device and subjected to specified postprocessing, is discharged onto the discharge tray by the sheet discharge device provided in the sheet postprocessing device.

In such a sheet discharge device shown above, a top face of the discharge tray is set at a position lower than a discharge port in order to ensure a sheet-stacking load. Therefore, during discharging of a sheet onto the discharge tray, a fore end of the sheet may hang down. In this case, the sheet may drop, in a rounded state, on the discharge tray or the fore end of the sheet may collide with the discharge tray, leading to occurrence of a sheet discharge failure or stacking failure. Accordingly, a support member (movable guide) for supporting part of a sheet discharged onto the discharge tray has conventionally been in use.

SUMMARY

A sheet discharge device according to one aspect of the present disclosure includes a sheet discharge port, a discharge member, a sheet discharge tray, a support member, a drive mechanism, and a controller. Through the sheet discharge port, sheets are discharged. The discharge member is placed at the sheet discharge port and conveys the sheets in a discharge direction. The sheet discharge tray is placed on a downstream side of the sheet discharge port in the discharge direction, and the sheets discharged from the sheet discharge port are to be stacked thereon. The support member is movable between a projective position in which the support member is projected from the sheet discharge port to above the sheet discharge tray so as to support an upstream portion of the sheets in the discharge direction and a retractive position in which the support member has retracted from the projective position to an upstream side of the sheet discharge port. The drive mechanism drives the support member. The controller controls the drive mechanism. The controller is enabled to adjust at least one of a projective length of the support member in its projective position and a shift timing from the projective position to the retractive position in response to characteristics of the sheets.

DETAILED DESCRIPTION

[1. Configuration of Image Forming System]

Figure 1:
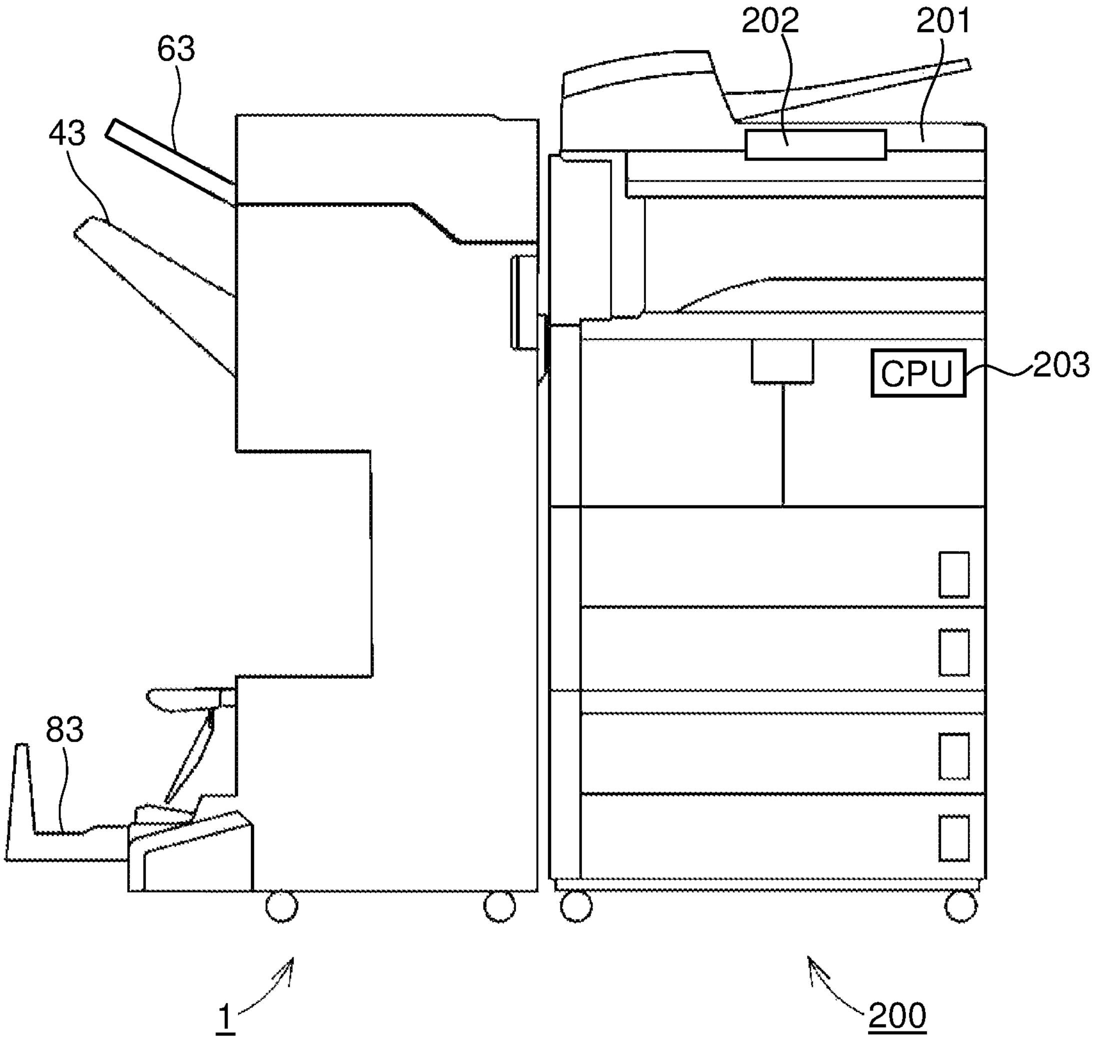
FIG. 1 is a schematic view showing a configuration of an image forming system which consists of a sheet postprocessing device according to one embodiment of the present disclosure, and an image forming apparatus to which the sheet postprocessing device is coupled.

Hereinafter, an embodiment of the present disclosure will be described in detail with reference to the accompanying drawings. FIG. 1 is a schematic view showing a configuration of an image forming system which consists of a sheet postprocessing device 1 according to one embodiment of the disclosure, and an image forming apparatus 200 to which the sheet postprocessing device is coupled.

As shown in FIG. 1, the image forming apparatus 200 prints out an image on a sheet (paper) on a basis of image data inputted from external via an unshown network communication part or image data read by an image reading part 201 placed on top of the image forming apparatus 200. In this embodiment, the image forming apparatus 200 is an inkjet recording apparatus which includes recording heads (not shown), as an image forming part, provided on an each-color basis and equipped with a multiplicity of nozzle holes through which ink is jetted out onto a sheet.

An operation panel 202 is placed forward of the image reading part 201. The operation panel 202 is an operation part for accepting various types of setting inputs. For example, a user is enabled to enter sheet-size information by operating the operation panel 202. Also by operating the operation panel 202, the user is allowed to enter a number of sheets to be printed and to instruct for a start of a print job. An main body controller 203 administers overall operations of the image forming apparatus 200 and controls individual parts of the image forming apparatus 200.

The sheet postprocessing device 1 is removably coupled to a side face of the image forming apparatus 200. The sheet postprocessing device 1 performs such postprocessing as a punch-hole forming process and a stapling process on a sheet having been subjected to image formation (printing) by the image forming apparatus 200. It is noted that the sheet postprocessing device 1 is not limited to one which performs postprocessing on a sheet automatically conveyed from the image forming apparatus 200, and may be one which allows a user to set a sheet on an unshown tray, the sheet then being conveyed up to a postprocessing-enabled position by the device itself and subjected to postprocessing.

[2. Configuration of Sheet Postprocessing Device]

Figure 2:
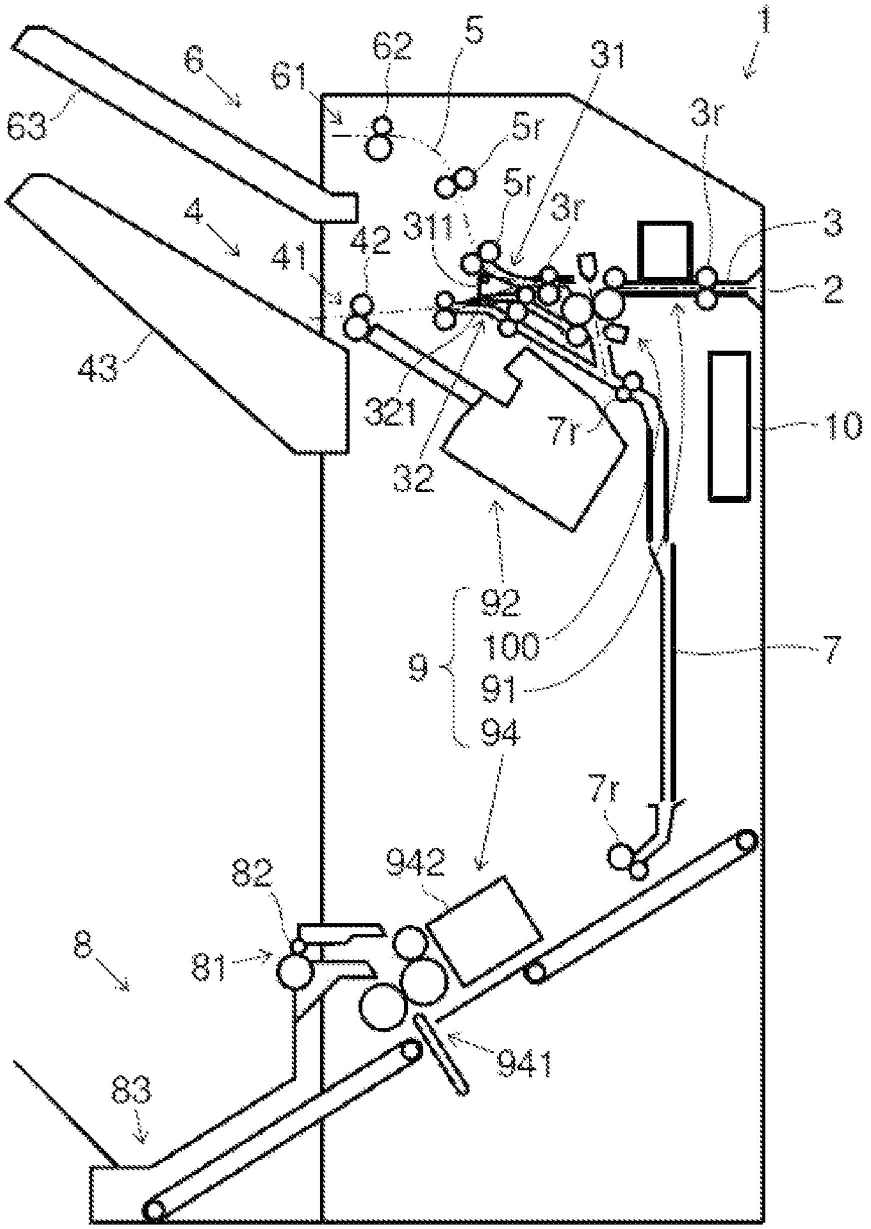
FIG. 2 is a side sectional view schematically showing a configuration of the sheet postprocessing device according to the embodiment.

FIG. 2 is a side sectional view schematically showing a configuration of the sheet postprocessing device 1 in this embodiment. The sheet postprocessing device 1, as shown in FIG. 2, includes a sheet inlet 2, a first sheet conveyance path 3, a first sheet discharge part 4, a second sheet conveyance path 5, a second sheet discharge part 6, a third sheet conveyance path 7, a third sheet discharge part 8, a postprocessing part 9, and a postprocessing controller (controller) 10.

The sheet inlet 2 is an opening provided in a side face of the sheet postprocessing device 1 facing the image forming apparatus 200. A sheet conveyed from the image forming apparatus 200 toward the sheet postprocessing device 1 is conveyed through the sheet inlet 2 so as to be carried into the sheet postprocessing device 1.

The first sheet conveyance path 3 extends from the sheet inlet 2 to the first sheet discharge part 4 in such a generally horizontal direction (leftward direction in FIG. 2) as to become farther from the image forming apparatus 200. It is noted that a direction from the sheet inlet 2 toward the first sheet discharge part 4 is referred to as a sheet conveyance direction of the first sheet conveyance path 3. The sheet inlet 2 is located at an upstream end of the first sheet conveyance path 3 in the sheet conveyance direction. The first sheet conveyance path 3, having thereon a plurality of conveyance roller pairs **3*r*, conveys a sheet, which has been carried through the sheet inlet 2 into the sheet postprocessing device 1**, toward a downstream side in the sheet conveyance direction.

The first sheet discharge part 4 is provided on a side face of the sheet postprocessing device 1 opposite to its side face facing the image forming apparatus 200. The first sheet discharge part 4 is placed at a downstream end of the first sheet conveyance path 3 in the sheet conveyance direction. The first sheet discharge part 4 includes a first discharge port 41, a first discharge roller pair 42, and a first discharge tray 43.

The first discharge port 41 is located at a downstream end of the first sheet conveyance path 3 in the sheet conveyance direction. The first discharge roller pair 42 is placed at the first discharge port 41. The first discharge tray 43 is located downstream of the first discharge port 41 in the sheet conveyance direction. A sheet conveyed along the first sheet conveyance path 3 and having reached the first discharge port 41 is passed through the first discharge port 41 and discharged onto the first discharge tray 43 by the first discharge roller pair 42. The first discharge tray 43 is one of terminal discharge places for sheets subjected to postprocessing by the sheet postprocessing device 1.

The second sheet conveyance path 5, branching from a first branch portion (branch portion) 31 on the first sheet conveyance path 3, extends up to the second sheet discharge part 6 laterally and upwardly in such a direction as to become farther from the image forming apparatus 200 (leftward direction in FIG. 2). The first branch portion 31 is placed downstream of a punching portion 91 in the first sheet conveyance path 3 in the sheet conveyance direction. It is noted that a direction directed from the first branch portion 31 toward the second sheet discharge part 6 is referred to as a sheet conveyance direction of the second sheet conveyance path 5. The first branch portion 31 is located at an upstream end of the second sheet conveyance path 5 in the sheet conveyance direction. The second sheet conveyance path 5, having a plurality of conveyance roller pairs **5*r*, leads a sheet, which is under conveyance on the first sheet conveyance path 3, such that the sheet branches at the first branch portion 31 so as to be conveyed toward the second sheet discharge part 6**.

The first branch portion 31 includes a first switching guide 311. The first switching guide 311 pivotally turns between a position in which a sheet conveyed on the first sheet conveyance path 3 from the sheet inlet 2 side is guided along the first sheet conveyance path 3 to the first discharge port 41, and another position in which the sheet is made to branch from the first sheet conveyance path 3 so as to be guided to the second sheet conveyance path 5. The first switching guide 311 further pivotally turns to yet another position in which a sheet subjected to a folding process and having passed through a later-described second folding conveyance path 106 is guided to the second sheet conveyance path 5. The first switching guide 311 is connected to a drive mechanism (not shown) and controlled in its operation by the postprocessing controller 10.

The second sheet discharge part 6 is provided upward of the first sheet discharge part 4 and on the side face of the sheet postprocessing device 1 opposite to its side face facing the image forming apparatus 200. The second sheet discharge part 6 is placed at a downstream end of the second sheet conveyance path 5 in the sheet conveyance direction. The second sheet discharge part 6 includes a second discharge port 61, a second discharge roller pair 62, and a second discharge tray 63.

The second discharge port 61 is located at a downstream end of the second sheet conveyance path 5 in the sheet conveyance direction. The second discharge roller pair 62 is placed at the second discharge port 61. The second discharge tray 63 is located downstream of the second discharge port 61 in the sheet conveyance direction. A sheet conveyed along the second sheet conveyance path 5 and having reached the second discharge port 61 is passed through the second discharge port 61 and discharged onto the second discharge tray 63 by the second discharge roller pair 62. The second discharge tray 63 is one of the terminal discharge places for sheets subjected to postprocessing by the sheet postprocessing device 1. In addition, such sheets as those destined for no postprocessing and those of smaller sizes are also discharged onto the second discharge tray 63.

The third sheet conveyance path 7, branching from a second branch portion 32 on the first sheet conveyance path 3, extends downward to the third sheet discharge part 8. It is noted that a direction directed from the second branch portion 32 toward the third sheet discharge part 8 is referred to as a sheet conveyance direction of the third sheet conveyance path 7. The second branch portion 32 is located on a downstream side of the first branch portion 31 in the sheet conveyance direction of the first sheet conveyance path 3, and moreover located at an upstream end of the third sheet conveyance path 7 in the sheet conveyance direction. The third sheet conveyance path 7, having a plurality of conveyance roller pairs **7*r*, leads a sheet, which is under conveyance on the first sheet conveyance path 3, such that the sheet is made to branch at the second branch portion 32 and conveyed toward the third sheet discharge part 8**.

The second branch portion 32 includes a second switching guide 321. The second switching guide 321 pivotally turns between a position in which a sheet conveyed on the first sheet conveyance path 3 from the sheet inlet 2 side is guided along the first sheet conveyance path 3 to the first discharge port 41, and another position in which a sheet, which is switched back after conveyance on the first sheet conveyance path 3 from the sheet inlet 2 side and passage through the second branch portion 32, is led to the third sheet conveyance path 7. The second switching guide 321 is connected to a drive mechanism (not shown) and controlled in its operation by the postprocessing controller 10.

The third sheet discharge part 8 is provided downward of the first sheet discharge part 4 (near a lower end portion of the sheet postprocessing device 1) and on the side face of the sheet postprocessing device 1 opposite to its side face facing the image forming apparatus 200. The third sheet discharge part 8 includes a third discharge port 81, a third discharge roller pair 82, and a third discharge tray 83.

The third discharge port 81 is located at a downstream end of the third sheet conveyance path 7 in the sheet conveyance direction. The third discharge roller pair 82 is placed at the third discharge port 81. The third discharge tray 83 is located downstream of the third discharge port 81 in the sheet conveyance direction. A sheet conveyed on the third sheet conveyance path 7 and having reached the third discharge port 81 is passed through the third discharge port 81 and discharged onto the third discharge tray 83 by the third discharge roller pair 82. The third discharge tray 83 is one of the terminal discharge places for sheets subjected to postprocessing by the sheet postprocessing device 1.

The postprocessing part 9 performs specified postprocessing on a sheet subjected to image formation by the image forming apparatus 200 and carried into the sheet postprocessing device 1. The postprocessing part 9 includes the punching portion 91, a sheet stapling unit 92, a sheet folding unit 100, and a bookbinding portion 94.

The punching portion 91 is placed in downstream-side close vicinity of the sheet inlet 2 in the first sheet conveyance path 3. The punching portion 91 performs a punching process on a sheet conveyed on the first sheet conveyance path 3, making a punch hole or holes formed thereon.

The sheet stapling unit 92 is placed in upstream-side close vicinity of the first sheet discharge part 4 in the sheet conveyance direction of the first sheet conveyance path 3. The sheet stapling unit 92 performs a stapling process on a sheet bundle formed by stacking a plurality of sheets, so that the sheet bundle is stapled. A detailed configuration of the sheet stapling unit 92 will be described later.

The sheet folding unit 100 is placed downstream of the punching portion 91 and upstream of the sheet stapling unit 92, in the sheet conveyance direction of the first sheet conveyance path 3. The sheet folding unit 100 performs a folding process on one sheet to form a fold or folds thereon. The sheet folding unit 100 is enabled to perform, for one sheet, such folding processes as two-folding, Z-folding, outward three-folding, and inward three-folding.

The bookbinding portion 94 is placed in upstream-side close vicinity of the third sheet discharge part 8 in the sheet conveyance direction of the third sheet conveyance path 7. The bookbinding portion 94 includes a middle-folding part 941, and a saddle-stitching part 942. The bookbinding portion 94 performs, on a sheet bundle formed by stacking a plurality of sheets, a middle-folding process and a saddle-stitching process for folding and stitching a generally central portion of the sheet bundle in the sheet conveyance direction to make up a booklet.

The postprocessing controller (controller) 10 includes a CPU, a storage part, and other electronic circuits and electronic components (none shown). The postprocessing controller 10 is communicably connected to the main body controller 203 of the image forming apparatus 200 (see FIG. 1). The postprocessing controller 10, receiving a command from the main body controller 203, controls operations of individual components provided in the sheet postprocessing device 1 on a basis of control programs and data stored in the storage part with use of the CPU, thereby fulfilling processes related to functions of the sheet postprocessing device 1. The first sheet conveyance path 3, the first sheet discharge part 4, the second sheet conveyance path 5, the second sheet discharge part 6, the third sheet conveyance path 7, the third sheet discharge part 8, and the postprocessing part 9 individually receiving commands from the postprocessing controller 10, perform postprocessing on a sheet in linkage with one another. In addition, instead, the functions of the postprocessing controller 10 may also be fulfilled by the main body controller 203 of the image forming apparatus 200 in addition to its inherent functions.

[3. Configuration of Sheet Stapling Unit]

Figure 3:
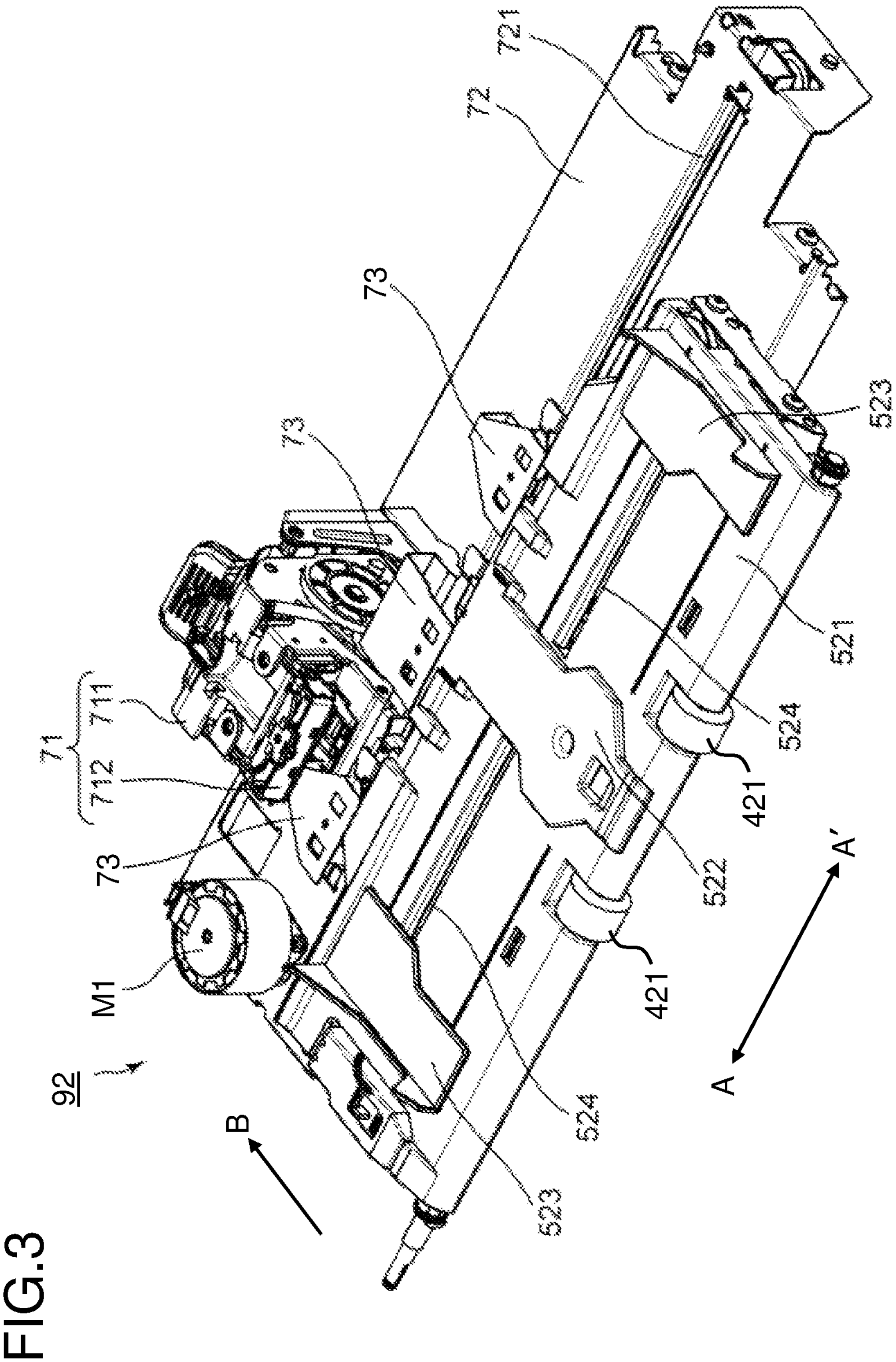
FIG. 3 is a perspective view of a sheet stapling unit which is mounted on the sheet postprocessing device of the embodiment.
Figure 4:
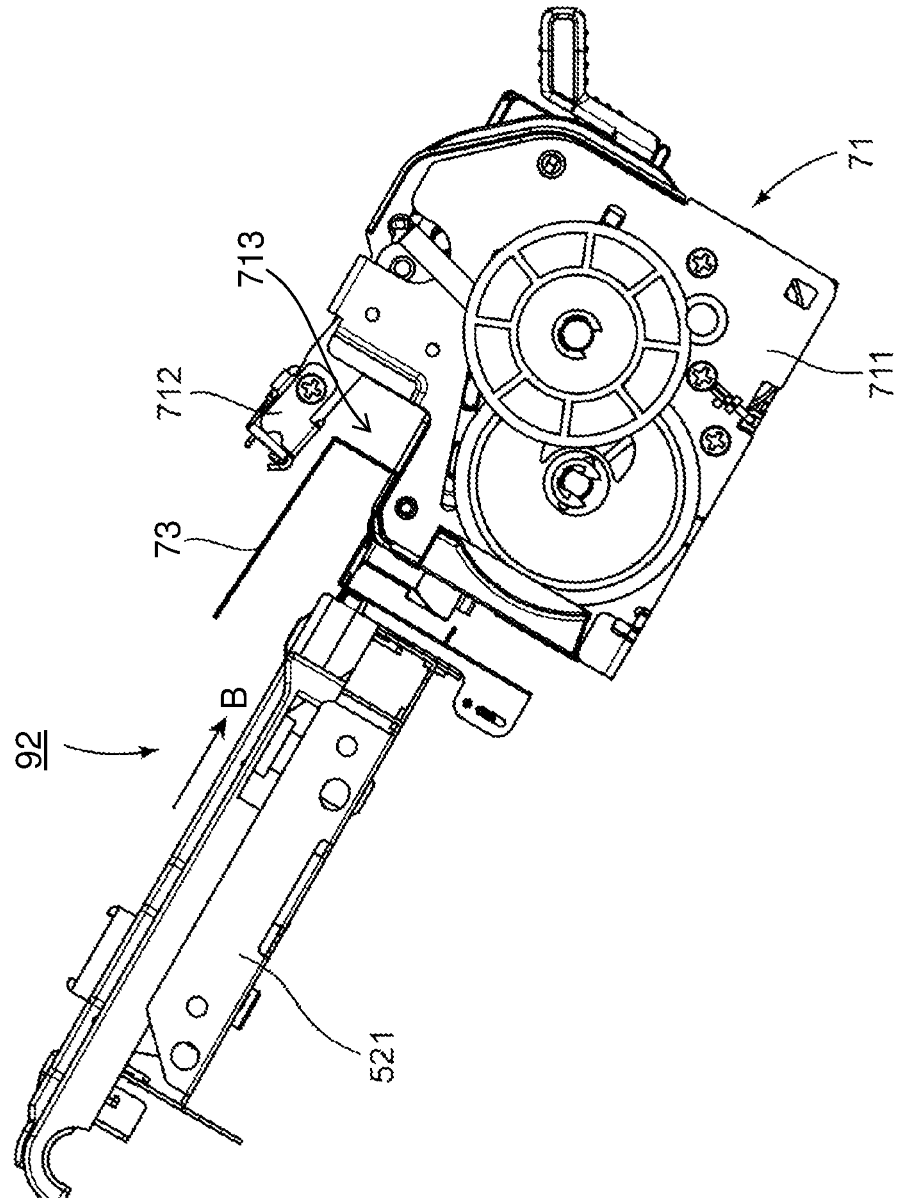
FIG. 4 is a side view of the sheet stapling unit.

Next, a configuration of the sheet stapling unit 92 is described. FIG. 3 is a perspective view of the sheet stapling unit 92 which is mounted on the sheet postprocessing device 1. FIG. 4 is a side view of the sheet stapling unit 92.

As shown in FIG. 3, the sheet stapling unit 92 includes a processing tray 521, a stapling part 71, and reference plates 73.

The processing tray 521 is a rectangular-shaped tray extending in a sheet widthwise direction (arrow A-A' direction) as well as in a carry-in direction. A plurality of sheets S (sheet bundle) to be subjected to the stapling process are stacked on the processing tray 521. In this case, each sheet S is carried onto the processing tray 521 along an alignment direction (a direction opposite to the carry-in direction) directed toward lower right of FIG. 4 (arrow B direction). The sheet bundle subjected to the stapling process is finally sent out by the first discharge roller pair 42 (see FIG. 2) in a direction opposite to the aforementioned alignment direction (a direction toward upper left in FIG. 4) so as to be discharged onto the first discharge tray 43 (see FIG. 2). A discharge lower roller 421 which is one component of the first discharge roller pair 42 is supported on a carry-in-direction downstream side (lower left side in FIG. 3) of the processing tray 521.

The processing tray 521 includes a tray central portion 522 and width-restricting members 523. The tray central portion 522 is placed at a central portion in the sheet-widthwise direction in a top face portion of the processing tray 521. The tray central portion 522 is a thin-plate like member which is fixed on the processing tray 521 with a slight height.

The width-restricting members 523 are placed in one pair so as to make the tray central portion 522 interposed therebetween in the sheet widthwise direction. The width-restricting members 523 restrict a sheet-widthwise position of a sheet S to be carried onto the processing tray 521. Each width-restricting member 523, which is a thin-plate like member as the tray central portion 522 is, has a side wall which is provided at a sheet-widthwise end portion so as to be erected upward. The processing tray 521 has a guide recess 524 formed therein so as to extend along the sheet widthwise direction. The width-restricting member 523 is enabled to reciprocate in the sheet widthwise direction along the guide recess 524 via a drive mechanism (not shown) such as a rack-and-pinion gear. In this embodiment, each time a sheet is carried onto the processing tray 521, the width-restricting members 523 are reciprocatively moved by the drive mechanism. As a result, sheets stacked on the processing tray 521 are aligned in the sheet widthwise direction.

The stapling part 71 is placed in opposition to a fore-end-side (right side in FIG. 4) end edge of the sheet in the alignment direction. The stapling part 71, being movable along the end edge of the sheet in the sheet widthwise direction (arrow A-A' direction) perpendicular to the carry-in direction by driving force of a stapling-part driving motor M1, performs the stapling process on a sheet bundle.

As shown in FIG. 4, the stapling part 71 includes a stapling main portion 711, and a stapling movable portion 712. The stapling main portion 711, being a main portion of the stapling part 71, internally contains a plurality of stapling needles (not shown). The stapling movable portion 712, being made up/down movable, inserts the stapling needles into a sheet. A recessed portion 713 into which the end edge of a sheet is to come is formed between the stapling main portion 711 and the stapling movable portion 712.

The reference plates 73 are fixed at three places separated from one another with sheet-widthwise intervals so as to be opposed to a downstream-side (upper right side in FIG. 3, lower right side in FIG. 4) end portion of the processing tray 521, in the alignment direction. Each reference plate 73 is generally U-shaped with its alignment-direction upstream side (upper left side in FIG. 4) opened, in a cross section perpendicular to the sheet widthwise direction. The reference plate 73 makes contact with the end edge of the sheet carried onto the processing tray 521 so as to align the sheet in the carry-in direction.

[4. Configuration of Around Processing Tray in Sheet Stapling Unit]

Figure 5:
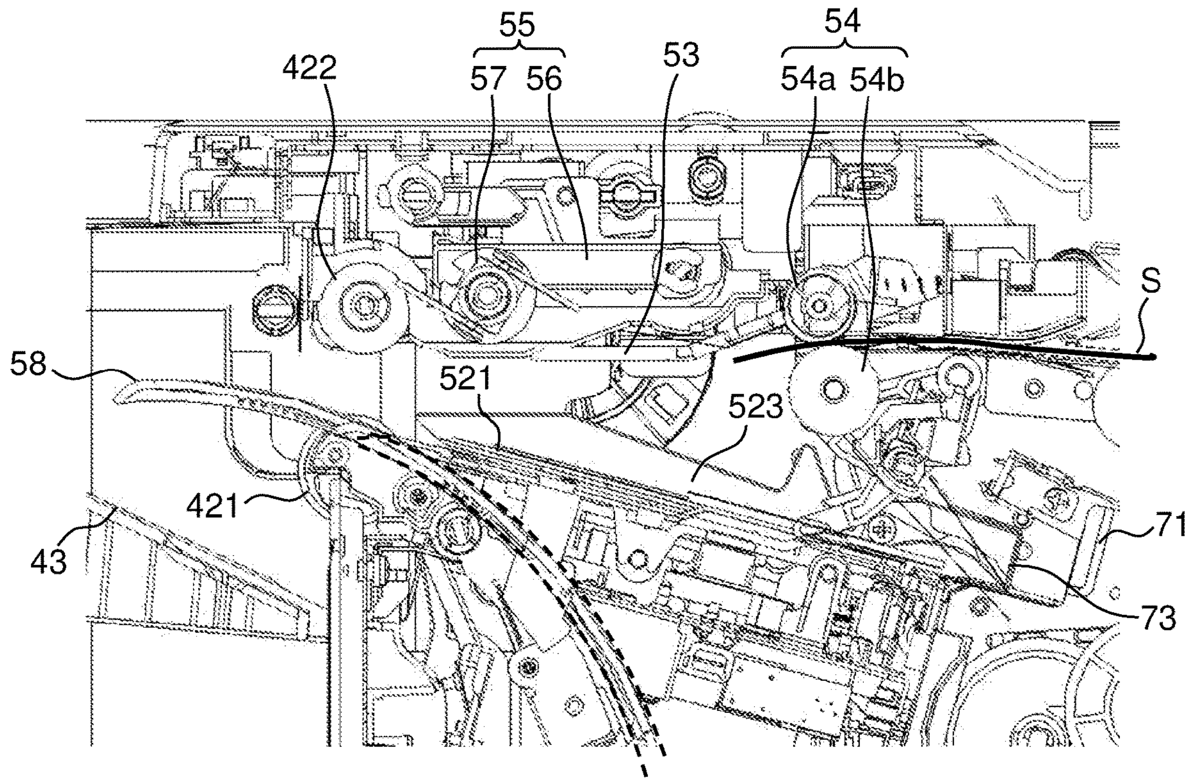
FIG. 5 is a side sectional view showing a structure of around a processing tray of the sheet stapling unit.

FIG. 5 is a side sectional view showing a structure of around the processing tray 521 and a support member 58. As shown in FIG. 5, a carry-in roller pair 54 is placed upward of the processing tray 521. The carry-in roller pair 54 is composed of a carry-in upper roller 54*a* and a carry-in lower roller 54*b*.

A sheet detection sensor 93 is placed in vicinity of the carry-in roller pair 54. The sheet detection sensor 93 detects a timing at which the sheet S has passed through the carry-in roller pair 54. As the sheet detection sensor 93, a PI (photointerrupter) sensor including a detector part composed of a light-emitting part and a light-receiving part is used as an example.

A tapping member 53 and an alignment member 55 are provided on a downstream side (left side in FIG. 5) of the carry-in roller pair 54 in the carry-in direction of the sheet S. The tapping member 53 is swingably supported along the carry-in direction of the sheet S. The tapping member 53 swings downward at a timing when a rear end of the sheet S has passed through the carry-in roller pair 54, so that the sheet S is tapped downward so as to be aligned along the processing tray 521.

The alignment member 55 is placed at a plurality of places (four places in this embodiment) along the sheet widthwise direction (a direction perpendicular to the drawing sheet of FIG. 5). The alignment member 55 makes the sheet S, which is about to be carried onto the processing tray 521, moved (switched back) in such an alignment direction that the sheet S gets nearer to the reference plates 73, thus giving aid for alignment of the sheet S. The alignment member 55 includes a paddle holder 56 and an alignment paddle 57.

The paddle holder 56 is supported upward of the processing tray 521 so as to be swingable along the carry-in direction of the sheet S. Rotation driving force is inputted to a swinging shaft 56*a* of the paddle holder 56 by a paddle driving motor (not shown). Inputted to the alignment paddle 57 by a drive source (not shown) such as a motor is rotation driving force in such a direction (counterclockwise direction in FIG. 5) as to send out the sheet S in the alignment direction. As the alignment paddle 57 is rotated in contact with a top face of the sheet S that is carried onto the processing tray 521, the sheet S is moved in an alignment direction so that end edges of the sheet S are thrust against the reference plates 73, thus the sheet S being aligned.

Swings of the paddle holder 56 are controlled based on a detection timing of the sheet detection sensor 93. More specifically, at a timing when the sheet detection sensor 93 detects that the fore end of the sheet S has passed through the carry-in roller pair 54, the paddle holder 56 is swung upward. As a result, the alignment paddle 57 is separated apart from the top face of the processing tray 521 (or of the sheets stacked on the processing tray 521).

FIG. 5 shows a state immediately before a new sheet S is carried onto the processing tray 521, in which state the paddle holder 56 swings upward (in a clockwise direction) and the alignment paddle 57 is placed at a position (reference position) separate from the processing tray 521. Also, the discharge lower roller 421 and a discharge upper roller 422, both of which compose the first discharge roller pair 42, are released from their nip. As a result of this, the sheet S carried from the carry-in roller pair 54 onto the processing tray 521 once passes through the first discharge roller pair 42 so as to be projected above the first discharge tray 43.

Then, at a timing when the end edge of a new sheet carried onto the processing tray 521 has passed under the alignment paddle 57, the paddle holder 56 is swung in the reverse direction (counterclockwise direction). As a result of this, the alignment paddle 57 is placed at such a position (acting position) as to make contact with the top face of the sheet S. Repeating the above-described operation each time a sheet S is carried makes it possible to securely put the alignment paddle 57 into contact with the top face of the sheet while avoiding interference between the end edge of the sheet S carried onto the processing tray 521 and the alignment paddle 57.

The support member 58 is placed downward of the processing tray 521. The support member 58, which is a bar-shaped member having a specified width in the sheet widthwise direction and extending in an arc shape in a discharge direction, is placed downward of the first discharge port 41. More specifically, the support member 58 is placed downward of the processing tray 521 and moreover downward of a discharge path of the sheet S discharged from the first discharge roller pair 42 along the processing tray 521. In this embodiment, the support member 58 is placed at two places in the sheet widthwise direction with a specified interval from the sheet-widthwise central portion of the processing tray 521.

Each support member 58 is movable between a projective position (solid-line position in FIG. 5) in which the support member 58 is projected to a discharge-direction downstream side (left side in FIG. 5) of the first discharge roller pair 42 and a retractive position (broken-line position in FIG. 5) in which the support member 58 has retracted to a discharge-direction upstream side (right side in FIG. 5) of the first discharge roller pair 42. The support member 58 is placed in the projective position upon carry-in (switch-back) of the sheet S onto the processing tray 521 to support part of the sheet projected to above the first discharge tray 43.

Figure 6:
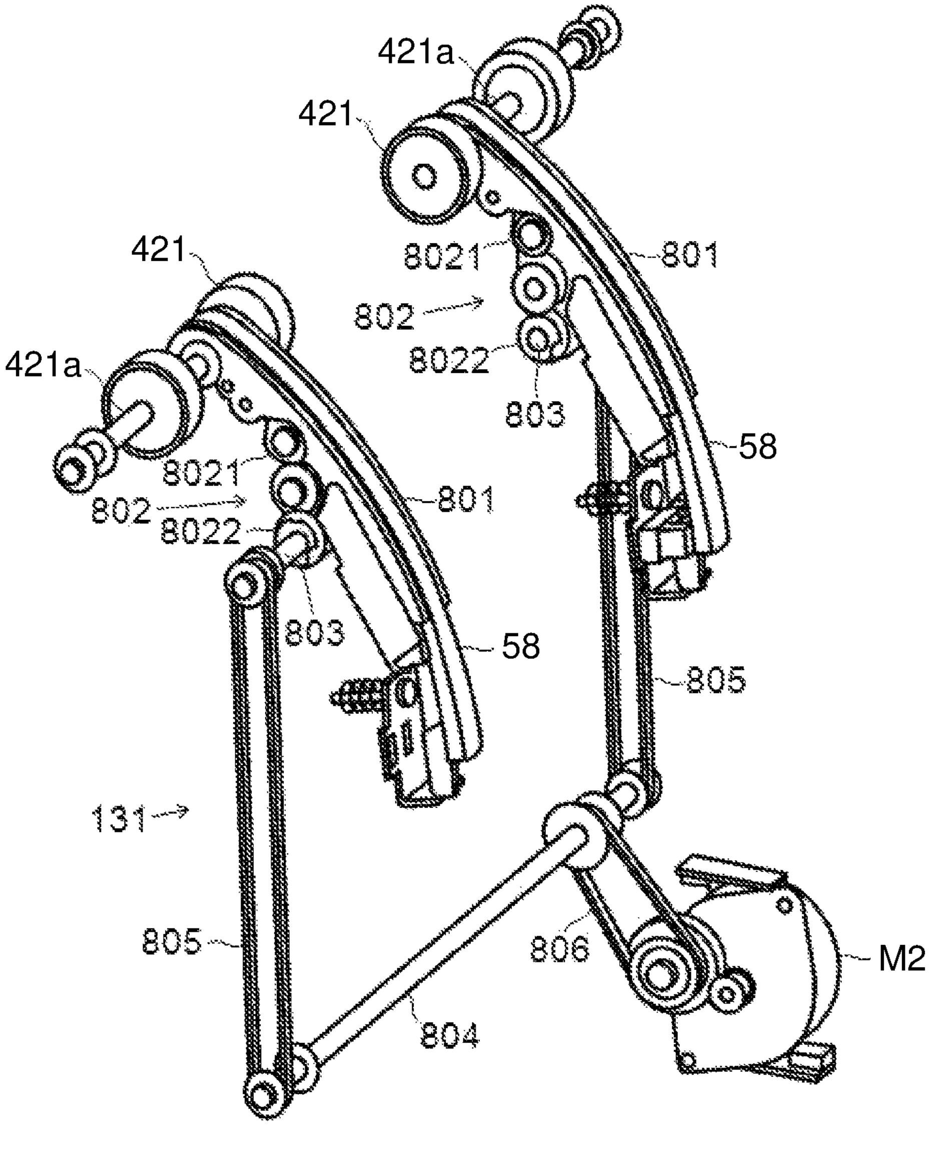
FIG. 6 is a perspective view of a support-member drive mechanism for driving support members.

FIG. 6 is a perspective view of a drive mechanism 131 for driving the support members 58. The support members 58 are supported by the drive mechanism 131 shown in FIG. 6 and displaced along the sheet discharge direction by the drive mechanism 131. The drive mechanism 131 includes guide rails 801, drive-transmitting gears 802, drive-transmitting shafts 803, a driving shaft 804, drive-transmitting belts 805, a driving belt 806, and a support-member driving motor M2.

The guide rails 801, the drive-transmitting gears 802, the drive-transmitting shafts 803, and the drive-transmitting belts 805 are provided each two in number in correspondence to the two support members 58. The driving shaft 804, the driving belt 806, and the support-member driving motor M2 are provided each one in number.

The guide rails 801 are placed upstream of the first discharge roller pair 42 in the sheet discharge direction. Each guide rail 801 is a member which is formed into a gutter shape with its upper face opened and which extends in an arc shape in the sheet discharge direction as the support member 58 does. The guide rail 801 internally contains and supports the support member 58.

The drive-transmitting gears 802 are placed under the guide rails 801. The drive-transmitting gears 802 are composed of a plurality of gears engaged with one another, including a pinion gear 8021 positioned at a guide rail 801-side terminal end and a drive-transmitting gear 8022 positioned at a drive-transmitting shaft 803-side terminal end.

The pinion gear 8021 is placed immediately under the guide rail 801. On a lower surface side of the support member 58, a rack (not shown) composing a rack-and-pinion gear mechanism is formed. The rack has a plurality of teeth arrayed along the sheet discharge direction. The pinion gear 8021 is engageable with the rack of the support member 58. In addition, an unshown window portion for engagement between the pinion gear 8021 and the rack of the support member 58 is formed at a place of the guide rail 801 adjacent to the pinion gear 8021.

Each drive-transmitting shaft 803 is placed below the drive-transmitting gears 802. The drive-transmitting shaft 803 extends along the sheet widthwise direction. The drive-transmitting gear 8022 of the drive-transmitting gears 802 is placed coaxial with the drive-transmitting shaft 803 so as to be rotatable along with the drive-transmitting shaft 803.

The driving shaft 804 is placed downward of the drive-transmitting shafts 803. The driving shaft 804 extends along the sheet widthwise direction.

Each drive-transmitting belt 805 is wound on the drive-transmitting shaft 803 and the driving shaft 804 via pulleys. In more detail, while two drive-transmitting belts 805 are wound on one driving shaft 804, each one of the drive-transmitting belts 805 is wound on a mutually different drive-transmitting shaft 803. The drive-transmitting belts 805 transmit rotational force of the driving shaft 804 to the drive-transmitting shafts 803, respectively.

The driving belt 806 is wound on the driving shaft 804 and a rotating shaft of the support-member driving motor M2 via a pulley. The driving belt 806 is turned around by the support-member driving motor M2. The support-member driving motor M2 is given by using a stepping motor capable of controlling turning direction and turning quantity (turning angle) with high precision by pulse control.

As the support-member driving motor M2 is rotated in the drive mechanism 131, rotational force of the support-member driving motor M2 is transmitted via the driving belt 806 to the driving shaft 804, causing the driving shaft 804 to be rotated. As the driving shaft 804 is rotated, rotational force is transmitted via the drive-transmitting belts 805 to the drive-transmitting shafts 803. As the drive-transmitting shafts 803 are rotated, rotational force is transmitted via the drive-transmitting gears 802 to the pinion gears 8021. As a result, the two support members 58 are simultaneously displaced along the sheet discharge direction. Displacement of the support members 58, i.e., operation of the drive mechanism 131 is controlled by the postprocessing controller 10.

[5. Adjustment Control for Projective Position of Support Member as Well as for Retraction Timing from Projective Position]

Next, adjustment control for a projective length of the support member 58 in its projective position as well as for its movement timing from the projective position to the retractive position is described. In this embodiment, at least one of the projective length of the support member 58 in its projective position and the movement timing (retraction timing) from the projective position to the retractive position is changed on a basis of flexibility (curlability) of the sheet S carried onto the first discharge tray 43.

More specifically, as the sheet S carried onto the first discharge tray 43 increases in fixability more and more, at least one of two types of control is executed, one being to control for increasing the projective length of the support member 58 in its projective position (projective-length adjustment control) and the other being to delaying the movement timing from the projective position to the retractive position (movement-timing adjustment control). The postprocessing controller 10 changes the projective length of the support member 58 in its projective position and the retraction timing from the projective position by transmitting control signals to the support-member driving motor M2 on a basis of output information as to characteristics of the sheet S such as conveyance-direction size, grain direction, thickness, grammage, and the like of the sheet S carried onto the first discharge tray 43, as well as on ink quantity used for image recording.

For example, when the sheet S is small in its conveyance direction (e.g., B5 size), a timing at which the fore end of the sheet S comes into contact with the first discharge tray 43 is delayed in the course of discharging the sheet S onto the first discharge tray 43. In other words, the fore end of the sheet S does not come into contact with the first discharge tray 43 until a time point when most part of the sheet S has been projected to above the first discharge tray 43. Therefore, the sheet S becomes more likely to curl at its fore end. This being the case, the projective length of the support member 58 in its projective position is increased more and more as the sheet S becomes smaller and smaller in its conveyance-direction size. Then, the timing when the support member 58 is moved to the retractive position is delayed.

On the other hand, when the sheet S is large in conveyance-direction size (e.g., A3 size), the timing at which the fore end of the sheet S comes into contact with the first discharge tray 43 is advanced. In other words, the fore end of the sheet S comes into contact with the first discharge tray 43 when part of the sheet S has been projected to above the first discharge tray 43. Therefore, the sheet S is less likely to curl at its fore end.

Further, in a case where the sheet S is large in its conveyance-direction size and that the support member 58 is large in its projective extent, after the sheet S is pulled onto the processing tray 521 and put on the support member 58, and when a next sheet S is conveyed up, contact area between the sheet S stacked on the processing tray 521 and a next sheet S is increased, entailing an increased conveyance load in pulling the sheet S onto the processing tray 521. As a consequence, there is a fear that the next sheet S may buckle on the processing tray 521 without being carried to the reference plates 73, leading to occurrence of alignment failure or paper jam.

Accordingly, the projective length of the support member 58 in its projective position is decreased more and more as the sheet S larger and larger in conveyance-direction size. More specifically, each support member 58 is placed at such a position that the fore end of the support member 58 overlaps with the discharge lower roller 421 that is one component of the first discharge roller pair 42. Then, the timing at which the support member 58 is moved to the retractive position is advanced.

Also, in a case where the sheet S is a sheet of paper, fibers making up the sheet S tend to be arrayed along a direction in which paper flows in a paper machine. This direction in which fibers are arrayed is referred to as 'grain direction' of the sheet S. When the grain direction of the sheet S is parallel to the widthwise direction (long grain), the fore end of the sheet S becomes more liable to curl. On the other hand, when the grain direction of the sheet S is parallel to the conveyance direction (short grain), the fore end of the sheet S becomes less liable to curl.

Accordingly, in a case where the grain direction of the sheet S is parallel to the widthwise direction, the projective length of the support member 58 in its projective position is increased and moreover the timing at which the support member 58 is moved to the retractive position is delayed. On the other hand, when the grain direction of the sheet S is parallel to the conveyance direction, the projective length of the support member 58 in its projective position is decreased and moreover the timing at which the support member 58 is moved to the retractive position is advanced.

Also, as thickness and grammage of the sheet S become larger and larger, the sheet S tends to be less liable to curl. As thickness and grammage of the sheet S become smaller and smaller, the sheet S tends to be more likely to curl. Accordingly, the projective length of the support member 58 in its projective position is decreased more and more as thickness and grammage of the sheet S becomes larger and larger, and moreover the timing at which the support member 58 is moved to the retractive position is advanced. Further, as thickness and grammage of the sheet S becomes smaller and smaller, the projective length of the support member 58 in its projective position is increased more and more, and moreover the timing at which the support member 58 is moved to the retractive position is delayed.

In yet another case where the image forming apparatus 200 coupled to the sheet postprocessing device 1 is an inkjet recording apparatus, moisture quantity of the sheet S increases as ink quantity to be used for image recording increases more and more, so that the sheet S tends to be more likely to curl. Accordingly, as the ink quantity increases more and more, the projective length of the support member 58 in its projective position is increased, and moreover the timing at which the support member 58 is moved to the retractive position is delayed. Also, as the ink quantity decreases more and more, the projective length of the support member 58 is decreased, and the timing at which the support member 58 is moved to the retractive position is advanced.

As described above, by adjustment of the projective length of the support member 58 in its projective position as well as the timing at which the support member 58 is retracted from the projective position, the sheet S, when flexible (liable to curl), is held in a flat posture immediately before the fore end of the sheet S is brought into contact with the first discharge tray 43 by the support member 58, so that curling of the sheet S is suppressed, making it implementable to fulfill stable discharge of the sheet S onto the first discharge tray 43. On the other hand, when the sheet S is less flexible (less liable to curl), conveyance load resulting from increase in the contact area with a next-coming sheet S can be decreased.

In this embodiment, relationships between optimum projective positions (projective lengths) of the support member 58 plus its retraction timings and output information as to sheet characteristics of the sheet S (size in the conveyance direction, grain direction, thickness, grammage, and ink quantity of the sheet S) are empirically determined beforehand. Then, those relationships are tabulated and stored in a storage region (memory) of the main body controller 203. From the main body controller 203, the postprocessing controller 10 reads out and determines the projective position of the support member 58 plus its retraction timing corresponding to the inputted output information as to the characteristics of the sheet S.

Figure 7:
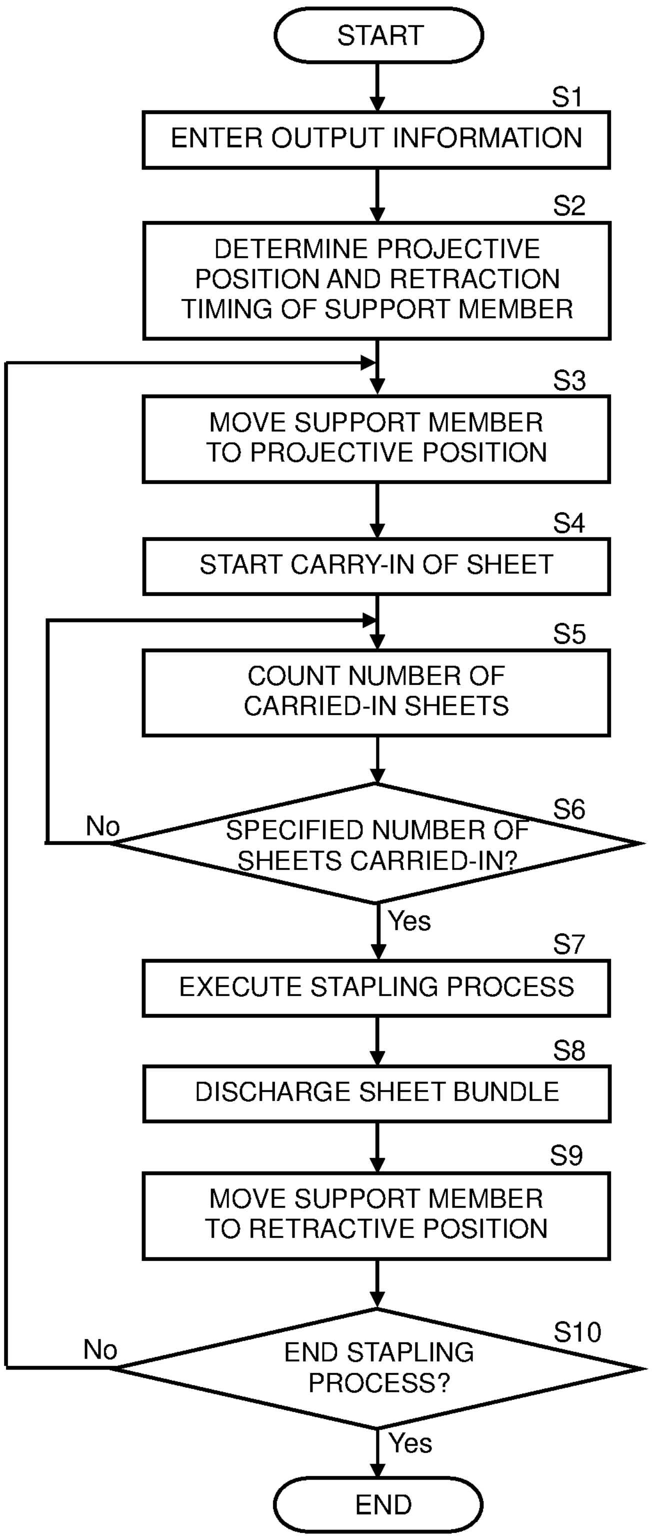
FIG. 7 is a flowchart showing an example of adjustment control for a projective position of each support member, as well as for a retraction timing from the projective position, in the sheet postprocessing device of the embodiment.

FIG. 7 is a flowchart showing an example of adjustment control for a projective position, as well as retraction timing from the projective position, of each support member 58 which is executed in the sheet postprocessing device 1 of the embodiment. With reference to FIGS. 1 to 6 as required, adjustment procedure for the projective length of the support member 58 in its projective position as well as its retraction timing from projective position will be described along steps of FIG. 7. In this case, it is assumed that the support member 58 is placed in the retractive position (broken-line positions in FIG. 5) in an initial state. In the following description, output information as to the characteristics of the sheet S will be also referred to simply as sheet output information.

When a stapling process command for sheets S is entered from the main body controller 203 of the image forming apparatus 200, sheet S output information is entered along with the stapling process command (step S1). Among the sheet S output information, information as to a type of the sheet S such as size, thickness, grammage, and grain direction of the sheet S is entered from the operation panel 202 of the image forming apparatus 200. For example, manufacturer, product name, product number and the like of the sheet S may previously be stored in the main body controller 203 in association with corresponding information as to the type of the sheet S. As a result of this, only a user's selection of manufacturer, product name, product number and the like of the sheet S by the operation panel 202 allows the main body controller 203 to recognize information as to the type of a sheet S for use. A conveyance speed and a conveyance interval of the sheet S are transmitted from the main body controller 203 of the image forming apparatus 200.

For information as to ink quantity, an ink quantity to be used for image recording is calculated by the main body controller 203 on a basis of image data transmitted from a personal computer or other high-order device or from the image reading part 201, and then transmitted from the main body controller 203.

Next, on a basis of the entered sheet S output information, the postprocessing controller 10 determines a projective position of each support member 58 as well as a retraction timing from the projective position, (step S2). As described before, the postprocessing controller 10 reads out relationships associated with projective positions as well as retraction timings of the support member 58 (driving pulse and driving timing of the support-member driving motor M2) corresponding to the entered information as to type and ink quantity of the sheet S, and determines the projective position and the retraction timing.

Next, the postprocessing controller 10 transmits a control signal to the support-member driving motor M2 so as to make the support member 58 moved from the retractive position to the projective position determined by step S2 (step S3). Then, carry of the sheet S, which has been carried into the sheet postprocessing device 1 via the sheet inlet 2, onto the processing tray 521 is started (step S4).

More specifically, when the sheet detection sensor 93 detects that a rear end of the sheet S has passed through the carry-in roller pair 54, the postprocessing controller 10 (see FIG. 2) instructs the tapping member 53 to tap the rear end of the sheet S so as to achieve alignment of the sheet S along the processing tray 521, followed by moving the paddle holder 56 downward to a specified extent. As a result of this, the alignment paddle 57 is moved to an acting position, coming into contact with the top face of the sheet S. In this state, the alignment paddle 57 is turned, causing the sheet S to be pulled in the alignment direction (arrow B direction) along the processing tray 521.

Thereafter, the sheet S is conveyed further to a downstream side in the alignment direction by the alignment paddle 57, aligned in the sheet widthwise direction by the width-restricting members 523 (see FIG. 3), and aligned and loaded in the carry-in direction by the reference plates 73.

The postprocessing controller 10 counts carry-in count of sheets S that are carried in onto the processing tray 521 (step S5). Then, each time one sheet S (or specified number of sheets S) is carried in, the postprocessing controller 10 makes a halt position of the paddle holder 56 shifted upward so that the acting position of the alignment paddle 57 is shifted upward continuously.

Next, the postprocessing controller 10 decides whether or not a specified number of sheets S have been carried in onto the processing tray 521 (step S6). When the specified number of sheets S have not been carried in (NO at step S6), the processing flow returns to step S5, continuing carry-in of sheets S onto the processing tray 521 and count of carried in sheets S.

When the specified number of sheets S have been carried in (YES at step S6), the postprocessing controller 10 transmits a control signal to the stapling-part driving motor M1 (see FIG. 3) so as to make the stapling part 71 moved to a specified stapling position. After the stapling part 71 has been moved to the specified stapling position, the postprocessing controller 10 transmits a control signal to the stapling part 71 so as to make the stapling process executed on a plurality of sheets S aligned by the reference plates 73 (step S7).

Next, the postprocessing controller 10 makes the first discharge roller pair 42 put into mutual contact (nip formation) and moreover rotated in the discharge direction. As a result of this, a bundle of sheets S subjected to the stapling process is discharged onto the first discharge tray 43 (see FIG. 2 for both members 42, 43) (step S8). In this case, the postprocessing controller 10 makes each support member 58 moved to the retractive position at the retraction timing determined by step S2 before the rear end of the bundle of sheets S passes through the first discharge roller pair 42 (step S9). After the bundle of sheets S has been discharged, the postprocessing controller 10 transmits a control signal to the stapling-part driving motor M1 so as to make the stapling part 71 moved to a standby position.

Thereafter, the postprocessing controller 10 decides whether or not the stapling process has been ended (step S10). When the stapling process is continuing (NO at step S10), the processing flow returns to step S3, followed by repetition of: movement of each support member 58 from the retractive position to the projective position; carry in of the sheet S onto the processing tray 521 plus count of carried in sheets; execution of the stapling process; discharge of the sheet bundle; and movement of each support member 58 from the projective position to the retractive position (steps S3 to S10). When the stapling process has been ended (YES at step S10), on the other hand, the processing is ended as it is.

According to the control example shown in FIG. 7, the projective position as well as the retraction timing from the projective position of each support member 58 are determined as an optimum position and timing based on the sheet S output information. Therefore, it becomes practicable to stably discharge onto the first discharge tray 43 without being affected by type of the sheet S or by ink quantity involved in image recording by the inkjet recording apparatus.

Further, by continuously varying the projective position and the retraction timing in response to the output information of the sheet S, the projective position and the retraction timing of the support member 58 can be set to an optimum position and timing responsive to the type of the sheet S as well as to ink quantity. Accordingly, even when the sheet S to be discharged is liable to curl, discharge failures and stacking failures of the sheet S can be effectively suppressed.

In addition, in the control example shown in FIG. 7, both the projective position and the retraction timing of the support member 58 are adjusted in response to the sheet S output information. However, either one of the projective position and the retraction timing of the support member 58 may also be adjusted.

Although an embodiment of the present disclosure has been described hereinabove, yet the scope of the disclosure is not limited to this, and the disclosure may be changed and modified in various ways unless those changes and modifications depart from the gist of the invention. For example, although the postprocessing controller 10 automatically adjusts the projective position, as well as the retraction timing from the projective position, of each support member 58 on a basis of the sheet S output information in the above embodiment, yet it is also possible to allow the user to adjust the projective position and the retraction timing of the support member 58 at an arbitrary timing. An example of such a configuration is that a maintenance mode for adjusting the projective position and the retraction timing of the support member 58 is provided in the operation panel 202, allowing the user to change over the projective length of the support member 58 in its projective position, as well as its retraction timing from the projective position, in response to stacking situations (alignability) of sheets S in the first discharge tray 43.

Also, the above embodiment is described on an example in which sheets S stacked on the processing tray 521 are subjected to the stapling process by the sheet stapling unit 92. However, without being limited to this, the disclosure may be such that sheets S stacked on the processing tray 521 are subjected to a shift discharge process or a folding process.

Also in the above embodiment, information as to type of the sheet S is entered from the operation panel 202 of the image forming apparatus 200. However, it is also allowable that sheet S output information is automatically acquired. For example, a media sensor may be placed at an arbitrary location on a sheet conveyance path from the image forming apparatus 200 to the sheet postprocessing device 1, in which case sheet S output information such as size, thickness, grammage, grain direction, and ink quantity of the sheet S to be carried from the image forming apparatus 200 into the sheet postprocessing device 1 can be detected by the media sensor.

For detection of the thickness of the sheet S, as an example, a laser coaxial displacement gauge for detecting a thickness of a sheet S by pinching the sheet S with two optical sensors may be used as the media sensor.

For detection of the grammage of the sheet S, a grammage sensor for measuring grammage by light transmittance to the sheet S may be used as the media sensor. In this case, since a relationship between light transmittance and grammage differs depending on the type of the sheet S, there is a need for selecting an optimum grammage conversion equation on a sheet-S type basis. Further, it is also possible to calculate a density ($g/m^3$) of a sheet S by dividing its grammage ($g/m^2$) by its thickness (m).

For detection of the grain direction of the sheet S, as an example, with an image pickup device used as the media sensor, a transmission image resulting when LED light is applied from back side of the sheet S under conveyance is picked up, and the picked-up transmission image is compared with reference images previously stored in the main body controller 203 to detect a grain direction of the sheet S. Otherwise, with an ultrasonic measuring device used as the media sensor, a reflected waveform resulting from application of ultrasonic waves to the sheet S may be measured and compared with reference waveforms previously stored in the main body controller 203 to detect a grain direction of the sheet S.

For detection of the type of the sheet S, a paper-type discrimination algorithm for discriminating a type of the sheet S by using density, surface property (regular reflection light, diffusion light), grammage and the like of the sheet S is used.

Furthermore, as the media sensor, a moisture content meter for detecting moisture content of the sheet S may be used to detect ink quantity of the sheet S.

Also in the above embodiment, the image forming apparatus 200 has been exemplified by an inkjet recording apparatus. However, electrophotographic printers and copiers are also usable as the image forming apparatus 200. In this connection, in the inkjet recording system in which ink is jetted out onto the sheet S, the conveyance load of the sheet S is more likely to vary as compared to the electrophotographic system. As a consequence, the present disclosure is particularly useful for the sheet postprocessing device 1 to which an inkjet recording apparatus is coupled as the image forming apparatus 200.

Furthermore, in the above embodiment, the sheet discharge device of this disclosure has been exemplified by the first sheet discharge part 4 of the sheet postprocessing device 1 coupled to the image forming apparatus 200. However, the sheet discharge device of the disclosure may also be applied to a sheet discharge part of the image forming apparatus 200 which is used without being coupled to the sheet postprocessing device 1.

The present disclosure is applicable to a sheet discharge device for discharging sheets as well as sheet postprocessing devices, image forming apparatuses and image forming systems including the sheet discharge device.

What is claimed is:

1. A sheet discharge device comprising:

a sheet discharge port through which sheets are discharged;

a discharge member which is placed at the sheet discharge port and which conveys the sheets in a discharge direction;

a sheet discharge tray which is placed on a downstream side of the sheet discharge port in the discharge direction and on which the sheets discharged from the sheet discharge port are to be stacked;

a support member movable between a projective position in which the support member is projected from the sheet discharge port to above the sheet discharge tray so as to support an upstream portion of the sheets in the discharge direction and a retractive position in which the support member has retracted from the projective position to an upstream side of the sheet discharge port;

a drive mechanism for driving the support member; and a controller for controlling the drive mechanism, wherein the controller is enabled to adjust a shift timing of the support member from the projective position to the retractive position in response to characteristics of the sheets.

2. The sheet discharge device according to claim 1, wherein the controller estimates a fixability of the sheets S on a basis of output information as to characteristics of the sheets, and then executes a control process of delaying a shift timing of the support member from the projective position to the retractive position as the fixability of the sheets increases more and more.

3. The sheet discharge device according to claim 2, wherein the output information as to characteristics of the sheets includes at least one of length in the discharge direction, thickness, grammage, and grain direction of the sheets.

4. A sheet postprocessing device comprising:

a processing part for performing specified postprocessing on sheets; and the sheet discharge device according to claim 1 for discharging the sheets there have been subjected to postprocessing by the processing part.

5. An image forming system comprising:

an image forming apparatus for forming images on sheets; and the sheet postprocessing device according to claim 4 for performing specified postprocessing on the sheets that have been subjected to image formation by the image forming apparatus.

6. An image forming system comprising:

an image forming apparatus for forming images on sheets; and a sheet postprocessing device including:

a processing part for performing specified postprocessing on sheets; and the sheet discharge device according to claim 2 for discharging the sheets that have been subjected to postprocessing by the processing part, wherein the image forming apparatus is an inkjet recording apparatus for performing image recording by jetting out ink onto the sheets, and the output information as to characteristics of the sheets includes ink quantity to be used for image recording onto the sheets.

7. An image forming apparatus comprising:

an image forming part for forming images on sheets; and the sheet discharge device according to claim 1 for discharging the sheets that have been subjected to image formation by the image forming part.

8. The image forming apparatus according to claim 7, wherein the image forming part performs image recording by jetting out ink onto the sheets.

9. An image forming system comprising:

an image forming apparatus for forming images on sheets; and a sheet postprocessing device including:

a processing part for performing specified postprocessing on sheets; and the sheet discharge device according to claim 2 for discharging the sheets that have been subjected to postprocessing by the processing part, the image forming system further comprising an input part for entering output information as to characteristics of the sheets.

10. An image forming system comprising:

an image forming apparatus for forming images on sheets; and a sheet postprocessing device including:

a processing part for performing specified postprocessing on sheets; and a sheet discharge device for discharging the sheets having been subjected to postprocessing by the processing part, the sheet discharge device including:

a sheet discharge port through which sheets are discharged;

a discharge member which is placed at the sheet discharge port and which conveys the sheets in a discharge direction;

a sheet discharge tray which is placed on a downstream side of the sheet discharge port in the discharge direction and on which the sheets discharged from the sheet discharge port are to be stacked;

a support member movable between a projective position in which the support member is projected from the sheet discharge port to above the sheet discharge tray so as to support an upstream portion of the sheets in the discharge direction and a retractive position in which the support member has retracted from the projective position to an upstream side of the sheet discharge port;

a drive mechanism for driving the support member; and a controller for controlling the drive mechanism, the controller being enabled to adjust at least one of a projective length of the support member in its projective position and a shift timing from the projective position to the retractive position in response to characteristics of the sheets wherein the image forming system further includes:

an input part for entering output information as to characteristics of the sheets and a projective length of the support member in the projective position, as well as the shift timing of the support member from the projective position to the retractive position, are arbitrarily adjustable by entry operation to the input part.

* * * * *